United States Patent [19]
Adams

[11] Patent Number: 4,872,728
[45] Date of Patent: Oct. 10, 1989

[54] TILT-BED TRAILER

[76] Inventor: Kevin T. Adams, 13840 Willow Branch Rd., Darlington, Wis. 53530

[21] Appl. No.: 178,501

[22] Filed: Apr. 7, 1988

[51] Int. Cl.⁴ .............................................. B60D 1/14
[52] U.S. Cl. ..................................... 298/5; 298/17 R; 414/483
[58] Field of Search .................. 298/5, 6, 17 B, 17 R; 414/483, 484, 485; 280/493, 503, 504

[56] References Cited

U.S. PATENT DOCUMENTS

| | | | |
|---|---|---|---|
| 1,894,320 | 1/1933 | Muchenberger-Wittlinger | 298/5 |
| 2,225,522 | 12/1940 | Keith | 298/5 |
| 2,491,417 | 12/1949 | Pflantz et al. | 298/5 |
| 2,495,354 | 1/1950 | Spearing et al. | 298/5 |
| 2,803,362 | 8/1957 | Saenz | 414/483 |
| 2,823,817 | 2/1958 | Holsclaw | 298/5 |
| 2,892,659 | 1/1959 | Francois | 298/5 |
| 2,901,138 | 8/1959 | Whalen | 414/483 |
| 3,198,365 | 8/1965 | Moll | 414/483 |
| 3,620,397 | 11/1971 | Gagnon | 414/482 |
| 3,661,286 | 5/1972 | Smith | 414/483 |
| 3,731,974 | 5/1973 | Stafford, Jr. | 298/17 R |
| 3,807,593 | 4/1974 | Bourton | 298/5 X |
| 3,874,683 | 4/1975 | Lawson | 414/483 X |
| 4,290,733 | 9/1981 | Lahman | 414/484 X |
| 4,494,797 | 1/1985 | Carberry | 298/5 |

Primary Examiner—Robert J. Spar
Assistant Examiner—Janice Krizek
Attorney, Agent, or Firm—Lathrop & Clark

[57] ABSTRACT

A tilt-bed trailer having a rotating flat bed is described. The trailer includes a hinge member for pivotally connecting the draw bar or tongue of the trailer to the trailer frame. The hinge member includes stabilizer plates mounted in fixed relation to the trailer frame and a bushing to prevent the deformation of the shape of the draw bar in order to enhance the precision of the rotation of the trailer bed with respect to the draw bar. In this manner, the trailer bed may rotate in precise locking engagement on the draw bar. Further, the trailer of the present invention may be provided with a device to increase the resistance in rotation of the trailer bed with respect to the draw bar.

14 Claims, 3 Drawing Sheets

TILT-BED TRAILER

FIELD OF THE INVENTION

The present invention is directed to a trailer, and in particular a flat-bed vehicle trailer in which the bed may be tilted to receive a heavy object. Such trailers are generally attached to the rear of a vehicle by a trailer hitch coupling mechanism on the forward end of the tongue or draw bar.

DESCRIPTION OF THE PRIOR ART

Trailers which have a rotating flat bed are known to the art. The trailers generally include a trailer bed frame mounted on one or more pairs of wheels. The frame is pivotally connected to one end of a draw bar. The other end of the draw bar may be attached to a vehicle to be pulled. For example, reference is made to U.S. Pat. Nos. 2,803,362 to Saenz, 2,495,354 to Spearing, et al., 2,491,417 to Pflantz, et al., 3,620,397 to Gagnon, and 3,661,286 to Smith. These trailers are generally equipped to allow the trailer bed to rotate such that the rear of the trailer bed will come into position with the ground, allowing an object to be moved onto the trailer bed. After the object has been placed on the trailer bed, the bed rotates to a horizontal position and locks in place on a draw bar thus allowing the trailer to be used.

It is important to provide a proper pivotal connection between the trailer frame and the draw bar in order to allow the trailer frame to precisely clamp onto the draw bar. A proper connection here is essential to the effective operation of the trailer. If the trailer frame is out of alignment with respect to the draw bar, the frame may not rotate into clamping relationship with the draw bar thereby creating a dangerous situation especially if the trailer frame cannot be locked into a stable horizontal position.

The hinge attachment which allows the trailer bed frame to rotate with respect to the draw bar has heretofore been subject to extensive amounts of wear. Generally, the hinge attachment consists of two parallelly disposed plates attached to the trailer bed frame, each plate having an aligned aperture. The rear end of the draw bar is also apertured. The apertures of the draw bar and the hinge plates are then placed in alignment to receive a hinge pin. Thus, the trailer bed frame may be rotated with respect to the draw bar by the journalled attachment of the draw bar to the hinge plates.

However, the hinge of the prior art has suffered from a series of deficiencies. Most noteworthy is the lack of stabilization of the hinge as the trailer is put in use. In time, the draw bar and the hinge plates may become deformed, thus increasing the play in the hinge. If the play in the hinge is significant, the trailer bed frame will move sideways with respect to the draw bar. Therefore, as the trailer bed frame rotates upon the draw bar, the clamping mechanism may miss its mark, thus preventing the trailer bed frame from securely locking onto the draw bar.

SUMMARY OF THE INVENTION

It is therefore an object of the present invention to provide a tilt-bed trailer in which the trailer bed frame will continually enter into precise locking engagement with a catch on the trailer draw bar.

It is further an object of the present invention to provide a tilt-bed trailer in which the resistance of the movement of the trailer bed may be adjusted with respect to the draw bar.

It is still further an object of the present invention to provide a tilt-bed trailer hinge which significantly avoids any play or movement between the trailer bed frame and the draw bar, which would cause the locking engagement between the trailer bed frame and the draw bar to become off center.

These and other objects are addressed by the present invention which discloses a tilt-bed trailer comprising at least one pair of wheels upon which is mounted a trailer bed frame. The trailer bed frame comprises a front member, two side members and a rear member. Additionally, a forward stabilizer cross bar and a rearward stabilizer cross bar are provided on the frame in substantially parallel relationship between the front and rear members. A draw bar is pivotally connected to the trailer bed frame by at least one hinge member. The draw bar has a forward end and at least one rearward end, the rearward end including means to prevent deformation of the shape of the rearward end. The hinge member comprises two substantially parallel stabilizer plates mounted in fixed relationship to and between the forward and rearward stabilizer cross bars. The two stabilizer plates are spaced apart a sufficient distance to receive the rearward end of the draw bar therebetween. Each stabilizer plate and the rearward portion of the draw bar have apertures which are in matching alignment to receive a hinge pin therethrough. Further, the tilt-bed trailer of the present invention includes means to adjust the resistence of the movement of the trailer frame with respect to the draw bar.

Further objects, features and advantages of the invention will become apparent from the following detailed description when taken in conjunction with the accompanying drawings.

DETAILED DESCRIPTION OF THE INVENTION

The present invention is directed to a flat bed trailer in which the bed may be tilted with respect to the trailer frame in order to receive a heavy object. Objects such as riding lawnmowers, all-terrain vehicles, and even larger vehicles such as cars, trucks, etc., may be easily carried by the trailer of the present invention. When the bed is tilted such that the rear end of the bed touches the ground, the vehicle may easily ride up onto the bed. The weight of the vehicle then counterbalances the bed causing the bed to tilt back to a horizontal axis. Because of the hinge system on the trailer of the present invention, the bed will tilt in a precise, uniform direction allowing the clamping means on the trailer bed to come into contact with the clamping means on the trailer draw bar in a precise manner. This is especially advantageous when objects are being loaded on hills or uneven terrain as any uneven alignment between the trailer bed and the trailer frame may prevent the trailer bed from clamping onto the draw bar, causing a dangerous situation.

Depending upon the size of the trailer, it can be adapted to be pulled by hand, small vehicles, such as riding lawnmowers, all terrain vehicles, or even bicycles. Larger trailers incorporating the features of the present invention may be pulled by cars, trucks, etc.

Figure 1:
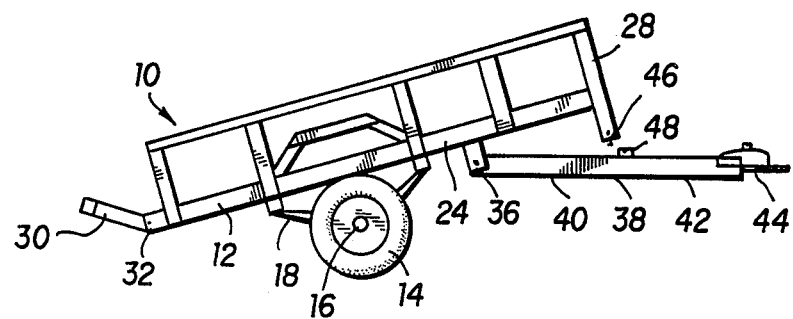
FIG. 1 illustrates a side elevation view of the trailer of the present invention.
Figure 2:
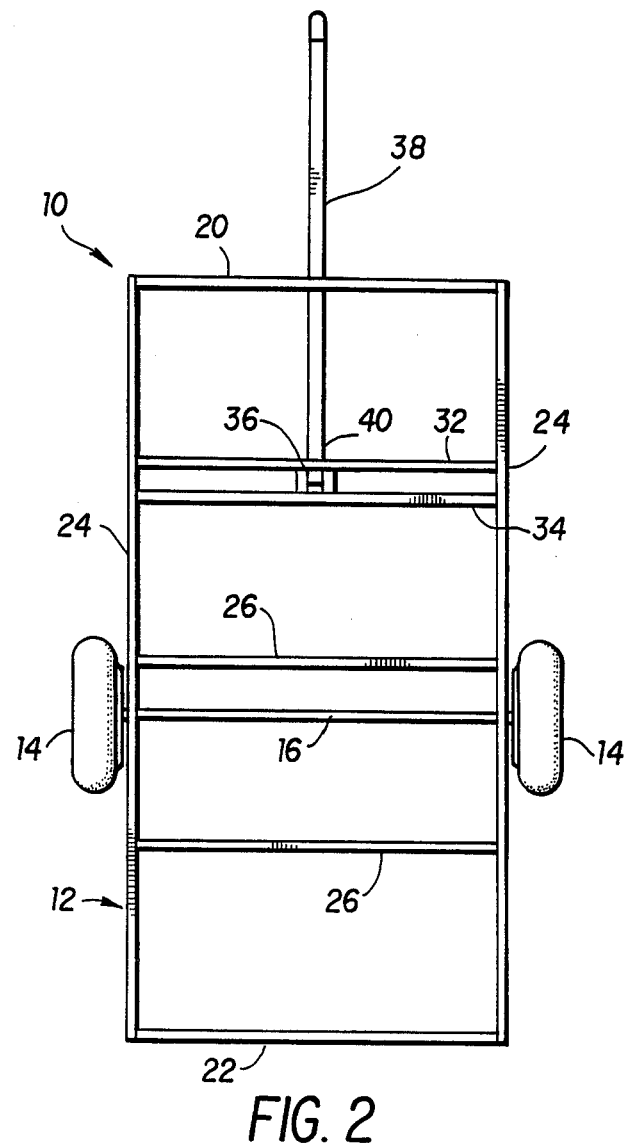
FIG. 2 illustrates an elevated top plan view of the trailer of the present invention.

Referring now to the figures in which the same numbers represent the same features throughout, FIGS. 1 and 2 illustrates a tilt-bed trailer, referenced by the number 10, of the present invention. The trailer 10 includes a trailer bed frame 12, which is supported by at least one pair of wheels 14. It is within the scope of the present invention to include more than one pair of wheels 14, depending upon the size of the trailer and the weight of the load on the trailer. The wheels 14 are connected together and to the trailer bed 12 by means of an axle 16. The trailer frame 12 may be supported on the axle by means of a shock absorber or spring assembly 18 as illustrated in FIG. 1.

The trailer frame 12 is generally shaped in a rectangle, as illustrated in FIG. 2. The frame 12 includes a front member 20, a rear member 22 in substantially parallel arrangement with the front member 20, and two substantially parallel side members 24. Each of the members 20, 22 and 24 are preferably formed of steel bars, wood or other rigid framing materials. The front, rear and side members 20, 22 and 24 are integrally connected to form the rectangular shape of the trailer bed frame. A series of cross bars 26 may be placed between side members 24 in substantially parallel arrangement with the front and rear members 20, 22, in order to further support the structure of the trailer frame 12. A platform (not illustrated) in the form of boards, metal sheeting, etc., may be placed upon the supporting members of the trailer frame 12 in order to receive the object on the trailer 10. If desired, a railing structure, illustrated at 28 in FIG. 1, may be placed around the perimeter of the trailer frame 12 in order to contain the object placed on the trailer 10. The rear section 30 of the railing 28 may be hingedly mounted at 32.

Referring now to FIG. 2, the trailer frame 12 includes forward and rearward stabilizer cross bars 32 and 34, respectively, which are mounted on side members 24 in substantially parallel alignment with front and rear members 20, 22. The purpose of the forward and rearward stabilizer cross bars 32, 34 are to provide a point of attachment for at least one hinge member 36, which will be described hereinafter. The hinge member 36 pivotally attaches a tongue or draw bar 38 to the frame 12 of the trailer 10 at the rearward portion 40 of the draw bar. The purpose of the draw bar 38 is to connect the trailer 10 to a vehicle or other means for pulling the trailer. The forward end 42 of the draw bar 38 may conveniently include a couple 44 for attachment to a trailer hitch (not illustrated) on a vehicle. Alternatively, the forward end 42 of the draw bar may be in the form of a handle to be grasped by an operator's hand. The trailer frame 12 is held in locking engagement with the draw bar 38 by a trailer clamp 46 which engages a draw bar clamp 48.

Figure 3:
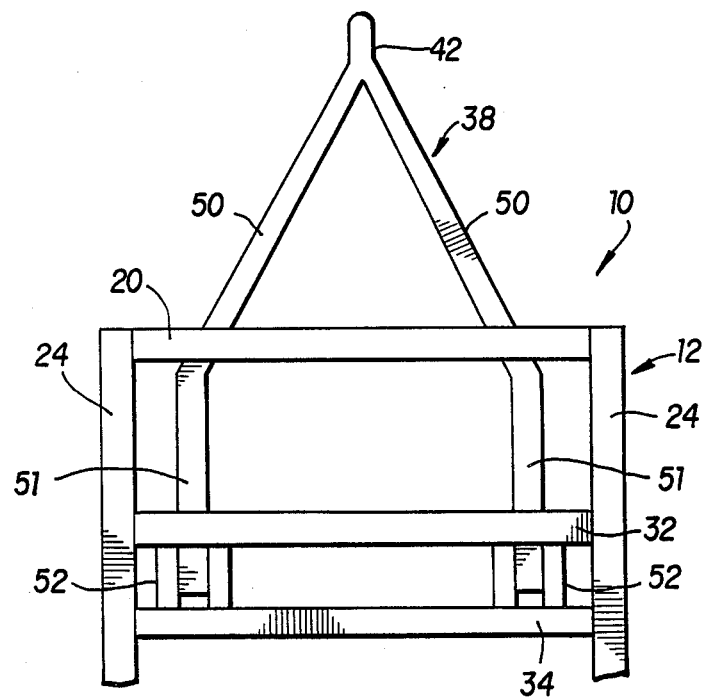
FIG. 3 illustrates an elevated top plan view of the forward portion of a second embodiment of the trailer of the present invention.

Referring now to FIG. 3, there is illustrated a second embodiment of the draw bar 38, in which the draw bar 38 is bifurcated into two side rails 50 from the forward end 42 of the draw bar 38 in a V-shaped pattern. The rearward ends 51 of the draw bar 38 are in substantially parallel position with respect to each other and to the side members 24 of the trailer frame 12. Each of the rearward ends 51 of the draw bar 38 are pivotally connected to the trailer frame by means of identical hinge members 52 which are connected to the trailer frame 12 by means of forward and rearward stabilizer cross bars 32, 34. By providing two points of pivotal attachment to the trailer frame 12, the alignment relationship between the trailer frame 12 and the draw bar 38 is more accurately determined.

Figure 4:
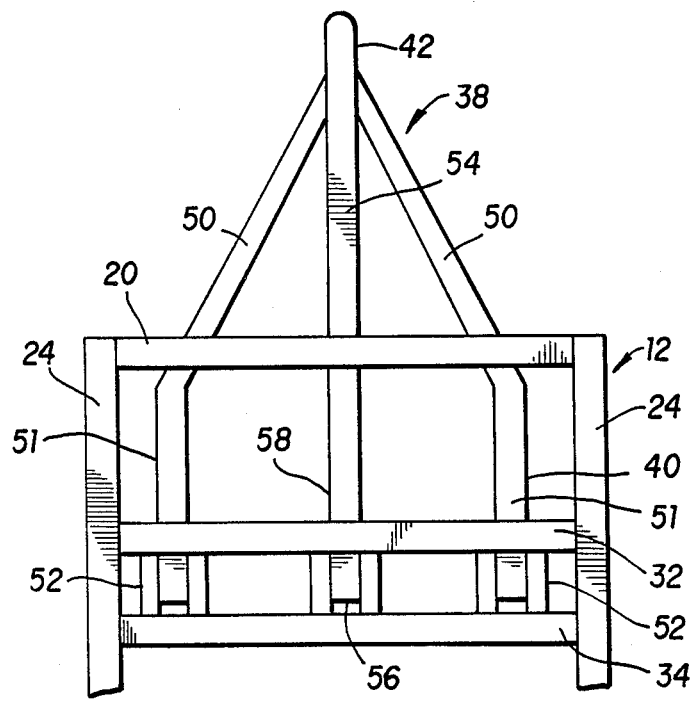
FIG. 4 illustrates an elevated top plan view of the forward portion of a third embodiment of the trailer of the present invention.

Referring now to FIG. 4, there is illustrated a third and preferred embodiment of the draw bar 38. The draw bar 38 of FIG. 4 includes a center bar 54, along with side bars 50. The center bar 54 is a substantially straight rail, which progresses from the forward end 42 of the draw bar 38 to a center hinge member 56, where it is pivotally attached to the trailer frame 12. The rearward end 58 of the center bar 54 is in substantial parallel alignment with the rearward portions 51 of the side bars 50. In this manner, the draw bar 38 of FIG. 4 is pivotally attached to the trailer frame 12 at three locations, affording the draw bar 38 an even more precise and accurate pivotal alignment with respect to the trailer frame 12.

Figure 5A:
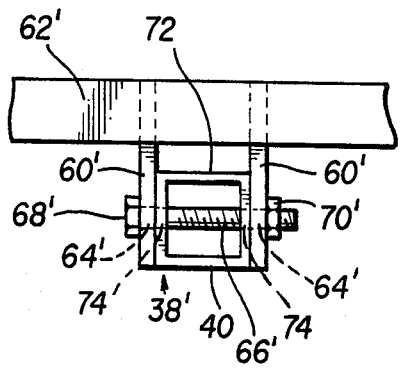
FIG. 5A illustrates a prior art version of a rear elevated view of the hinge member of the trailer of the present invention.
Figure 5B:
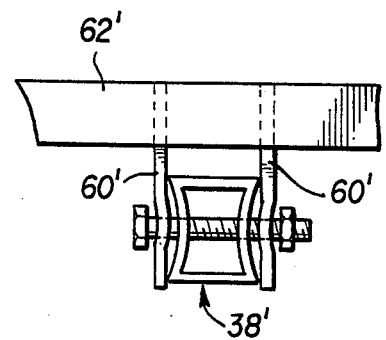
FIG. 5B illustrates a prior art version of a rear elevated view of the hinge member of FIG. 5A showing wear to the hinge.
Figure 6:
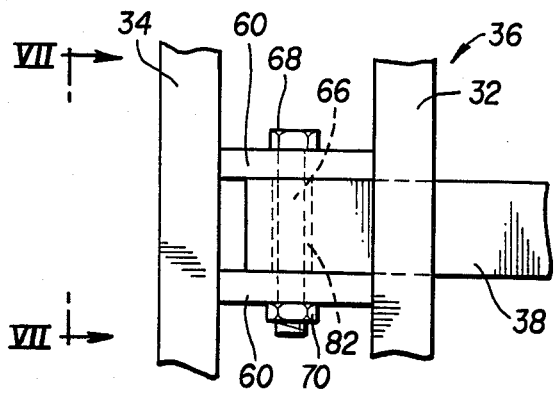
FIG. 6 illustrates a top plan view of the trailer hinge of FIG. 2.
Figure 7:
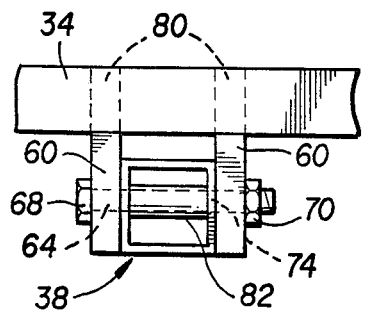
FIG. 7 illustrates a rear elevated view of the hinge of FIG. 6 taken along lines VII—VII.

Referring now to FIGS. 6 and 7, there is illustrated an enlarged version of the hinge member 36, which is secured to the trailer frame 12 by means of forward and rearward stabilizer cross bars 32, 34. The advantage of the hinge member 36 of the present invention can be best described by a comparison of a prior art hinge which is illustrated in FIGS. 5A and 5B. Referring now to FIG. 5A, there is illustrated a prior art hinge attachment for a tilt-bed trailer, in which the hinge includes two side plates 60', generally formed of steel or other hard, non-resilient material, which are attached to a single stabilizer bar 62' by welding or other known means of attachment. The plates 60' are provided with apertures 64' to receive a hinge pin 66', here illustrated as a threaded bolt 68' with a co-acting receiving nut 70' threaded thereon. The draw bar 38 is generally a hollowed rectangular tubing, having walls 72, commonly formed of steel, iron or other sturdy material. The rearward end 40 of the draw bar 38 also has apertures 74, shown in phantom lines, drilled therethrough which are in alignment with apertures 64' to receive hinge pin 66'. Initially, the prior art hinge member illustrated in FIG. 5A, provides a pivotal attachment between the draw bar 38 and the trailer frame 12. However, as the trailer is used, the prior art hinge member begins to deform, as illustrated in FIG. 5B. This is due to the extended use of the trailer and the sideways movement of the trailer as the trailer is in use. The deformation on the draw bar 38 allows the draw bar 38 to move sideways with respect to the side plates 60'. Additionally, because the side plates 60' are only attached to one cross bar 62', the side plates 60' may also become deformed over time. The result is a loosened hinge attachment between the trailer frame and the draw bar creating a misalignment between the trailer frame and the draw bar. Therefore, after the trailer bed has rotated on the frame to receive an object and is rotated back into horizontal position, the play in the prior art hinge member will create a situation in which the clamping means 46, 48 will not connect. This could create a dangerous situation, especially if an object is being loaded on a hill or if the trailer is used when the trailer frame is not coupled to the draw bar.

Referring now to FIG. 6 and 7, the hinge member 36 of the present invention overcomes the deficiencies of the prior art hinge members. The hinge member 36 of the present invention is first provided with two stabilizer cross bars 32, 34 which are rigidly and orthogonally connected to side plates 60 at 80, by welding or other means known to the art. By providing two stabilizer cross bars, the side plates 60 are rigidly secured to the trailer frame 12 in substantially parallel alignment with substantially no possibility of deformation.

Further a bushing 82, made of steel or other nonresilient material, is placed within the hollow tubing of the draw bar 38 and reamed with an aperture which is in direct alignment with the apertures 64 and 74 of side plates 60 and draw bar 74 respectively. Thus, the hinge pin 66 is provided with a passageway through side plates 60, draw bar 38 and bushing 82 for journalled attachment. The bushing 82 may be provided with a lubricating device, such as an oil seal or other means known to the art in order to lubricate the hinge member 36. It is also within the scope of the present invention to provide a solid draw bar thus obviating the need for a bushing.

By the installation of a front stabilizer cross bar 32 and the bushing 82, the hinge member 36 of the present invention provides a precision pivotal attachment between the draw bar 38 and the trailer frame 12. Therefore, the trailer may be used for extended periods of time without causing deformation of the hinge member which would place the trailer frame 12 out of alignment with respect to the draw bar 38.

The advantages of the present invention are enhanced by use of draw bars as illustrated in FIG. 3 and especially FIG. 4.

Reference is now made to the hinge pin 66, as illustrated in FIGS. 6 and 7. Although there are a number of hinge pins known to the art which may be used to pivotally connect the trailer frame to the draw bar, a preferred hinge pin is in the form of a threaded bolt 68 and co-acting receiving nut 70. Preference is given to this embodiment of a hinge pin specifically because the threaded bolt/nut hinge pin may conveniently be tightened or loosened as desired. For example, tightening the hinge pin, by tightening the nut 70 onto the bolt 68, will increase the resistance of rotational movement of the trailer frame 12 with respect to the draw bar 38. This is advantageous in the case of very heavy objects being loaded onto the trailer 10. If there is resistance in the movement between the trailer frame 12 and the draw bar 38, the heavy objects may be conveniently loaded onto the trailer frame 12 in an even manner without fear of the trailer frame quickly slipping into locking engagement with respect to the draw bar 38. Therefore, the resistance applied to the hinge member 38 will cause the trailer frame 12 to rotate at a smoother and slower torque with respect to the draw bar. Alternatively, the hinge pin 66 may be loosened if the object being placed on the trailer 10 is lighter.

Therefore, the resistance in the rotation of the trailer frame 12 with respect to the draw bar 38 may advantageously be tightened or loosened depending upon the weight of the load to be received on the trailer bed. For example, if a heavy piece of machinery, such as a riding lawnmower, is to be placed on the trailer bed, the nut 70 may be tightened on the bolt 68 to increase the resistance in the rotation of the trailer bed, thereby preventing the trailer bed from slamming shut on the coupling mechanism 46, 48 as the weight of the machinery causes the trailer bed to rotate into the locking position on the draw bar 38.

Figure 8:
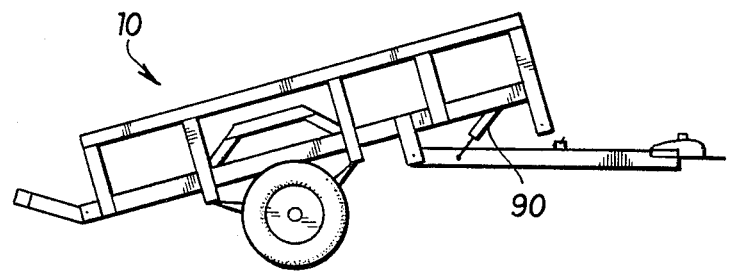
FIG. 8 illustrates another embodiment of the trailer of the present invention.

Reference is now made to FIG. 8 which discloses a further embodiment of a portion of the trailer 10, illustrating a shock absorber 90 which may also be utilized to affect the resistance in rotation of the trailer frame 12 with respect to the draw bar 38.

It is understood that the invention is not confined to the particular construction and arrangement herein illustrated and described, but embraces such modified forms thereof as come within the scope of the following claims.

What is claimed is:

1. A tilt-bed trailer comprising:
   (a) at least one pair of wheels;
   (b) a trailer frame mounted on the wheels, the trailer frame comprising a front member, two side members, a rear member, a forward stabilizer cross bar and a rearward stabilizer cross bar, wherein the forward and rearward stabilizer cross bars are distinct from and located in substantially parallel relationship between the front and rear members;
   (c) a draw bar pivotally connected to the trailer frame, the draw bar having a forward end and at least one rearward end, the rearward end including means to prevent deformation of the shape of the rearward end;
   (d) means for releasably locking the trailer frame to the draw bar; and
   (e) a hinge member for pivotally connecting the rearward end of the draw bar to the trailer frame, the hinge member comprising two substantially parallel stabilizer plates mounted orthogonally to the forward and rearward stabilizer cross bars, and a hinge pin, the two stabilizer plates being spaced apart a sufficient distance to receive the rearward end of the draw bar therebetween, wherein each stabilizer plate and the rearward portion of the draw bar include apertures which are in matching alignment to receive the hinge pin therethrough and wherein the forward and rearward stabilizer cross bars are positioned to substantially eliminate any deformation of the stabilizer plates.

2. The trailer of claim 1 wherein the draw bar is bifurcated near the forward end to form a pair of side rails disposed in V-formation, the side rails having substantially parallel rearward extensions to provide two pivotal connections to the trailer frame, wherein each rearward extension is provided with a hinge member as recited in section (e) of claim 1.

3. The trailer of claim 1 wherein the draw bar further comprises a pair of side rails disposed in V-formation from the forward end of the draw bar, the side rails having substantially parallel rearward ends which are substantially parallel to the rearward end of the draw bar, wherein the rearward ends of the side rails and the draw bar provide three pivotal connections to the trailer frame, and wherein each rearward end is provided with a hinge member as recited in section (e) of claim 1.

4. The trailer of claim 1 wherein the means to prevent deformation of the shape of the rearward end of the draw bar is a bushing placed in matching alignment with the draw bar apertures, the bushing being sufficiently reamed to receive the hinge pin threaded through the draw bar apertures.

5. The trailer of claim 1 further comprising means to adjust the resistance of the rotation of the trailer frame with respect to the draw bar.

6. The trailer of claim 5 wherein the hinge pin is a threaded bolt having a co-acting receiving nut threaded thereon, wherein the nut is adapted to be further tightened on the bolt in order to increase the resistance of the rotational movement of the trailer frame with respect to the draw bar.

7. The trailer of claim 5 wherein the means to adjust the resistance of the movement of the trailer frame with respect to the draw bar includes a shock absorber.

8. The trailer of claim 1 wherein the forward end of the draw bar includes a trailer hitch coupling means adapted to hitch the trailer to a vehicle.

9. In a tilt-bed trailer comprising at least one pair of wheels, a trailer frame mounted on the pair of wheels, the trailer frame comprising a front member in substantial parallel relationship with a rear member, two substantially parallel side members, and a draw bar pivotally connected to the trailer frame, the draw bar having a forward end and at least one rearward end, the improvement comprising:

(a) a forward stabilizer cross bar and a rearward stabilizer cross bar, wherein the forward and rearward stabilizer cross bars are distinct from and located in substantially parallel relationship between the front and rear members of the trailer frame, and (b) a hinge member for pivotally connecting the rearward end of the draw bar to the trailer frame, the hinge member comprising two substantially parallel stabilizer plates mounted orthogonally to the forward and rearward stabilizer cross bars, and a hinge pin, wherein the two stabilizer plates are spaced apart a sufficient distance to receive the rearward end of the draw bar therebetween, wherein each stabilizer plate and the rearward portion of the draw bar have apertures which are in matching alignment to receive the hinge pin therethrough and wherein the forward and rearward stabilizer cross bars are positioned to substantially eliminate any deformation of the stabilizer plates.

10. The tilt-bed trailer of claim 9, further comprising means to adjust the resistance of the movement of the trailer frame with respect to the draw bar.

11. The trailer of claim 10 wherein the hinge pin is a threaded bolt having a co-acting receiving nut threaded thereon, wherein the nut is adapted to be further tightened on the bolt in order to increase the resistance of the rotational movement of the trailer frame with respect to the draw bar.

12. The trailer of claim 10 wherein the means to adjust the resistance of the movement of the trailer frame with respect to the draw bar includes a shock absorber.

13. The trailer of claim 9 wherein the forward end of the draw bar includes a trailer hitch coupling means adapted to hitch the trailer to a vehicle.

14. The trailer of claim 9 further comprising means to prevent deformation of the shape of the rearward end of the draw bar, the means including a bushing placed in matching alignment with the draw bar apertures, the bushing being sufficiently reamed to receive the hinge pin threaded therethrough.

* * * * *